United States Patent
Kirby et al.

(10) Patent No.: US 9,598,901 B2
(45) Date of Patent: Mar. 21, 2017

(54) QUIET MOTORIZED WINDOW TREATMENT SYSTEM

(71) Applicant: Lutron Electronics Co., Inc., Coopersburg, PA (US)

(72) Inventors: David A. Kirby, Zionsville, PA (US); Robert C. Newman, Jr., Emmaus, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 71 days.

(21) Appl. No.: 14/490,327

(22) Filed: Sep. 18, 2014

(65) Prior Publication Data

US 2015/0075732 A1   Mar. 19, 2015

Related U.S. Application Data

(60) Provisional application No. 61/879,305, filed on Sep. 18, 2013.

(51) Int. Cl.
| | |
|---|---|
| *A47G 5/02* | (2006.01) |
| *E06B 9/72* | (2006.01) |
| *F16H 1/46* | (2006.01) |

(52) U.S. Cl.
CPC .............. *E06B 9/72* (2013.01); *F16H 1/46* (2013.01); *E06B 2009/725* (2013.01)

(58) Field of Classification Search
CPC ............................. E06B 9/72; E06B 2009/725
USPC ....................................... 160/309, 310, 238
See application file for complete search history.

(56) References Cited

U.S. PATENT DOCUMENTS

| | | | | |
|---|---|---|---|---|
| 4,079,597 | A | * 3/1978 | Lindner | E06B 9/72 192/142 R |
| 5,336,136 | A | * 8/1994 | Jacqui | E06B 9/72 475/275 |
| 5,467,266 | A | 11/1995 | Jacobs et al. | |
| 6,100,659 | A | 8/2000 | Will et al. | |
| 6,497,267 | B1 | 12/2002 | Azar et al. | |

(Continued)

FOREIGN PATENT DOCUMENTS

| | | | |
|---|---|---|---|
| DE | GB 1192757 A * | 5/1970 | ............... E06B 9/88 |
| DE | 3139073 A1 | 4/1983 | |

(Continued)

*Primary Examiner* — Katherine Mitchell
*Assistant Examiner* — Johnnie A Shablack
(74) *Attorney, Agent, or Firm* — Condo Roccia Koptiw LLP

(57) ABSTRACT

A motorized window treatment system may include a roller tube, a covering material windingly attached to the roller tube, and a drive assembly that may be at least partially disposed within the roller tube. The drive assembly may include a motor having a drive shaft that is elongate along a longitudinal direction and a drive gear attached to the drive shaft such that a toothed portion of the drive gear is cantilevered with respect to the drive shaft. The drive assembly may include a gear assembly having a pair of intermediate gears on opposed sides of the drive gear. Rotation of the drive gear may be transferred through the pair of intermediate gears, a connecting gear, a planetary gear set, a cage, and an idler to the roller tube. Rotation of the roller tube may cause the covering material to move between an open position and a closed position.

26 Claims, 7 Drawing Sheets

(56) References Cited

U.S. PATENT DOCUMENTS

| | | | |
|---|---|---|---|
| 6,700,246 B1 * | 3/2004 | Bruhn | E06B 9/72 192/12 BA |
| 6,935,403 B2 | 8/2005 | Killo et al. | |
| 6,983,783 B2 * | 1/2006 | Carmen, Jr. | E06B 9/68 160/120 |
| 7,051,782 B2 | 5/2006 | Nichols, Jr. et al. | |
| 7,723,939 B2 * | 5/2010 | Carmen, Jr. | H02K 11/022 318/16 |
| 7,839,109 B2 * | 11/2010 | Carmen, Jr. | E06B 9/68 318/466 |
| 8,597,157 B2 * | 12/2013 | Pezet | E06B 9/72 475/347 |
| 8,708,877 B2 * | 4/2014 | Kirihara | E06B 9/72 492/15 |
| 2002/0145349 A1 * | 10/2002 | Astengo | E06B 9/72 310/105 |
| 2003/0118965 A1 | 6/2003 | Iwatani et al. | |
| 2005/0035238 A1 * | 2/2005 | Fun | E06B 9/72 242/381 |
| 2006/0232233 A1 * | 10/2006 | Adams | E06B 9/72 318/280 |
| 2006/0232234 A1 * | 10/2006 | Newman, Jr. | E06B 9/72 318/280 |
| 2008/0121353 A1 * | 5/2008 | Detmer | E06B 9/72 160/266 |
| 2009/0090805 A1 * | 4/2009 | Hwaung | E06B 9/72 242/390.1 |
| 2010/0181031 A1 * | 7/2010 | Cannaverde | E06B 9/174 160/314 |
| 2010/0219306 A1 | 9/2010 | Detmer et al. | |
| 2011/0017411 A1 * | 1/2011 | Yeh | E06B 9/42 160/310 |
| 2012/0261078 A1 * | 10/2012 | Adams | E06B 9/32 160/6 |
| 2013/0118695 A1 * | 5/2013 | Adams | E06B 9/72 160/310 |
| 2013/0240165 A1 | 9/2013 | Chambers et al. | |
| 2014/0332172 A1 * | 11/2014 | Hsieh | E06B 9/84 160/133 |
| 2015/0075732 A1 * | 3/2015 | Kirby | E06B 9/72 160/310 |
| 2015/0159433 A1 * | 6/2015 | Adams | E06B 9/32 160/168.1 P |
| 2015/0284997 A1 * | 10/2015 | Hall | H02P 29/027 160/7 |

FOREIGN PATENT DOCUMENTS

| | | | | |
|---|---|---|---|---|
| DE | 3139073 C2 * | 5/1990 | | E06B 9/72 |
| DE | 19725961 A1 * | 12/1998 | | E06B 9/72 |
| DE | EP 1898042 A2 * | 3/2008 | | E06B 9/72 |
| EP | 2 385 210 A1 | 11/2011 | | |
| FR | 2 742 834 A1 | 6/1997 | | |
| GB | EP 0522690 A2 * | 1/1993 | | E06B 9/62 |
| WO | WO 2006/107602 A2 | 10/2006 | | |

\* cited by examiner

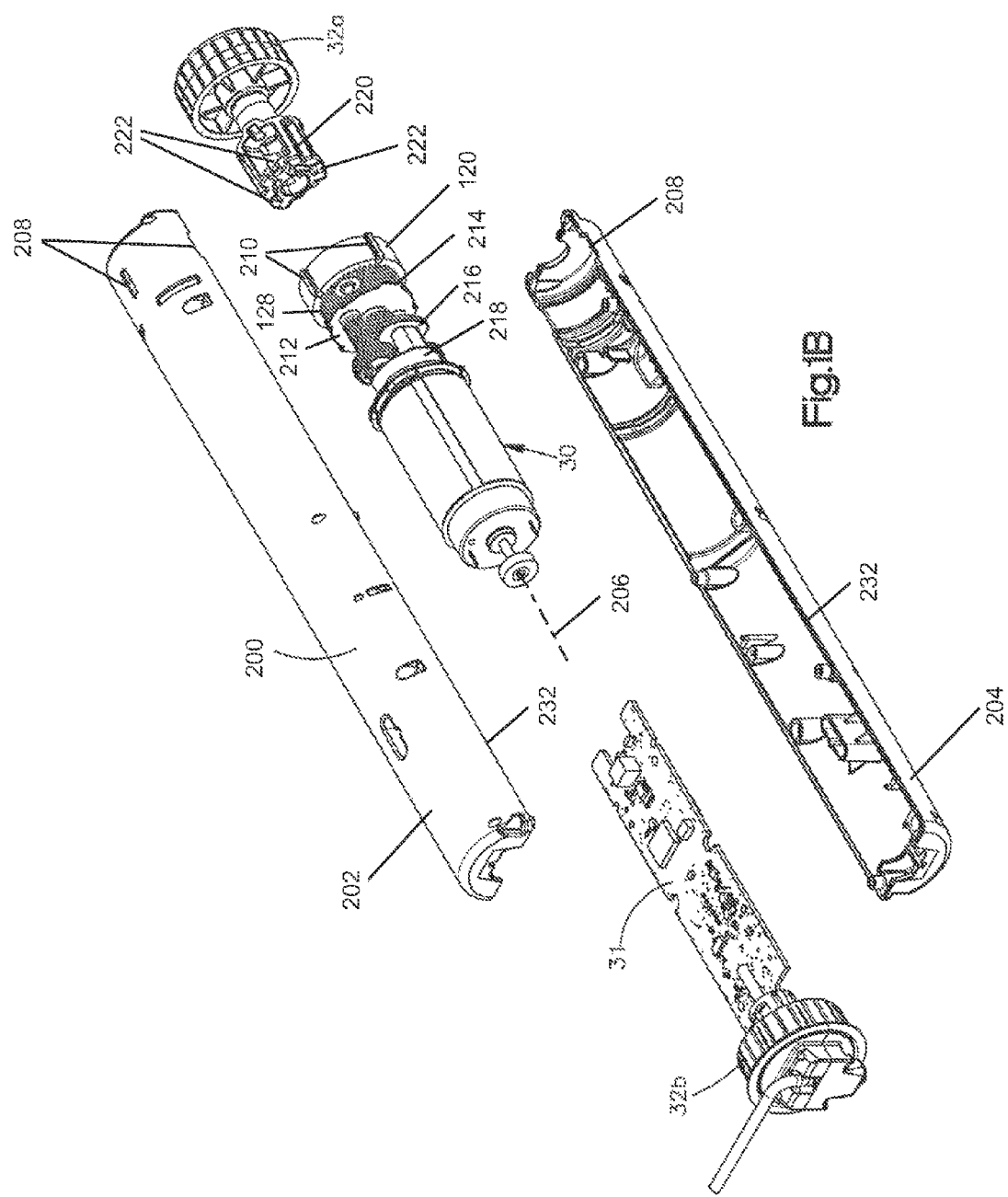

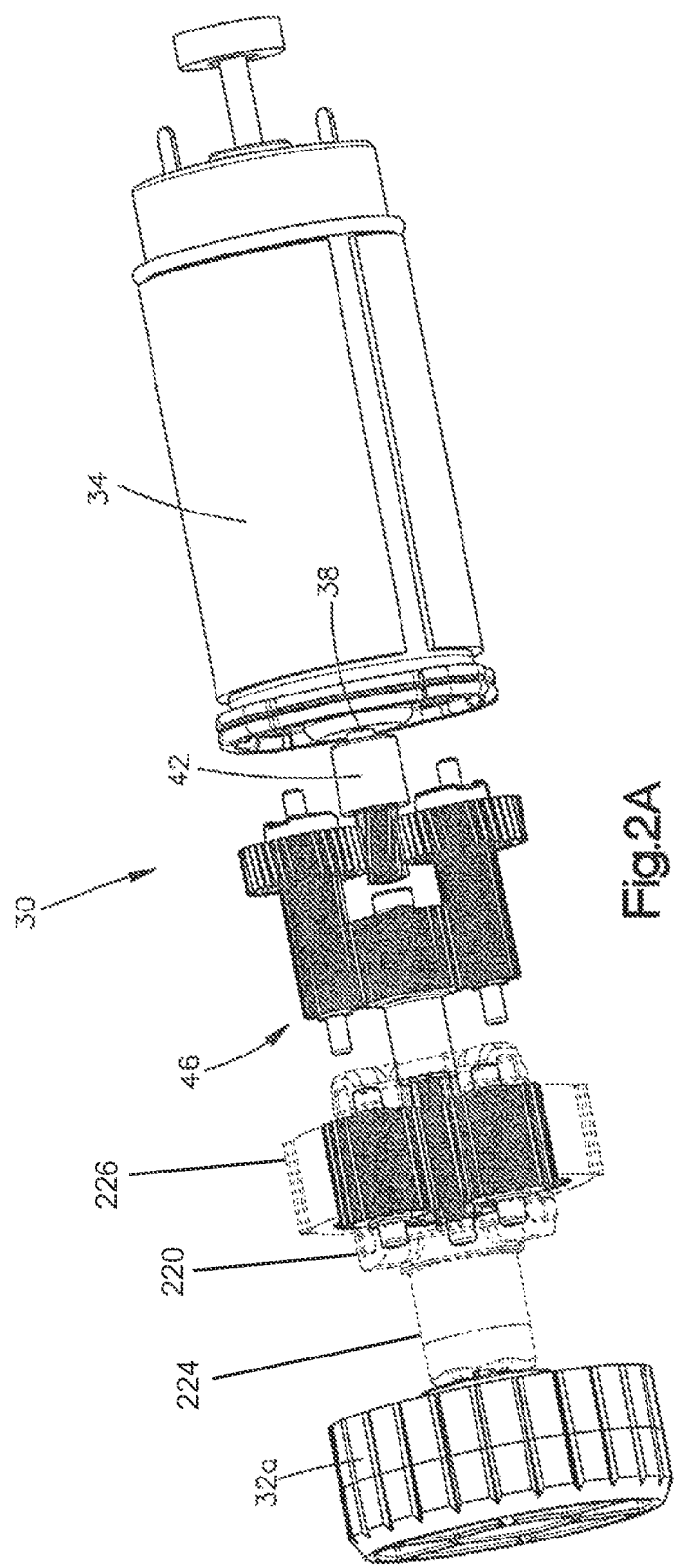

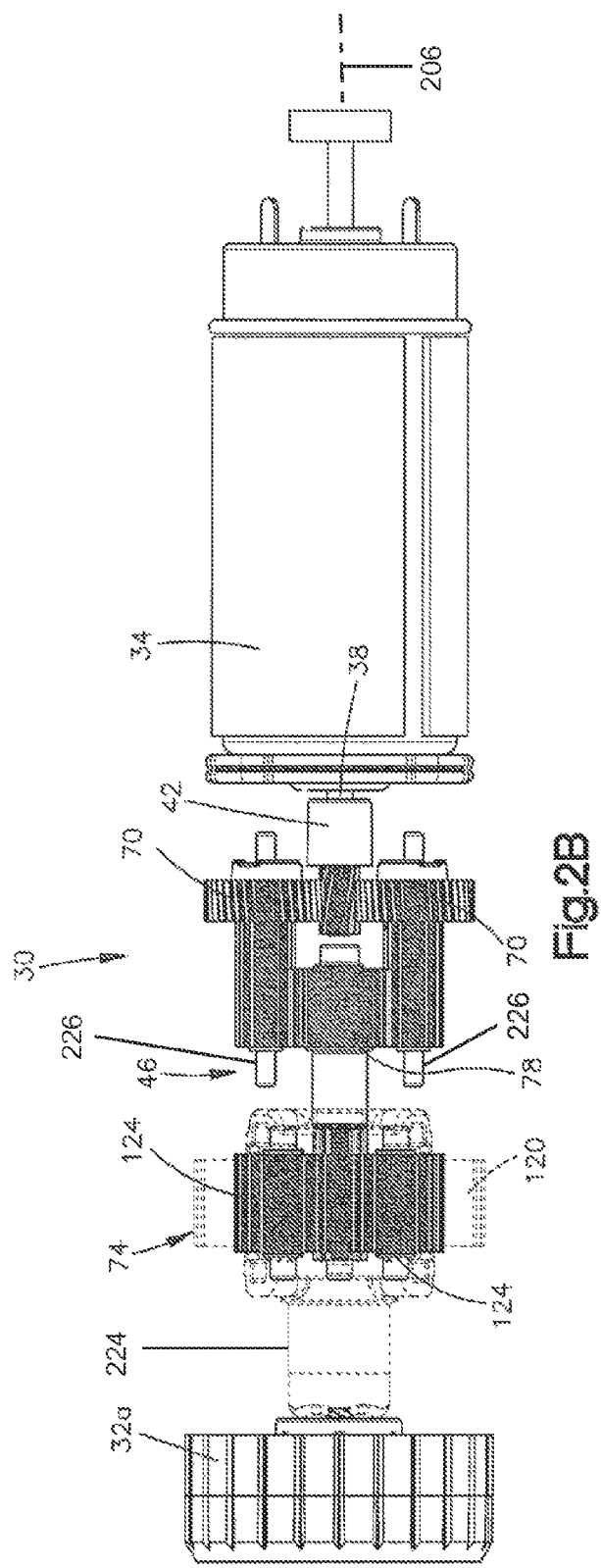

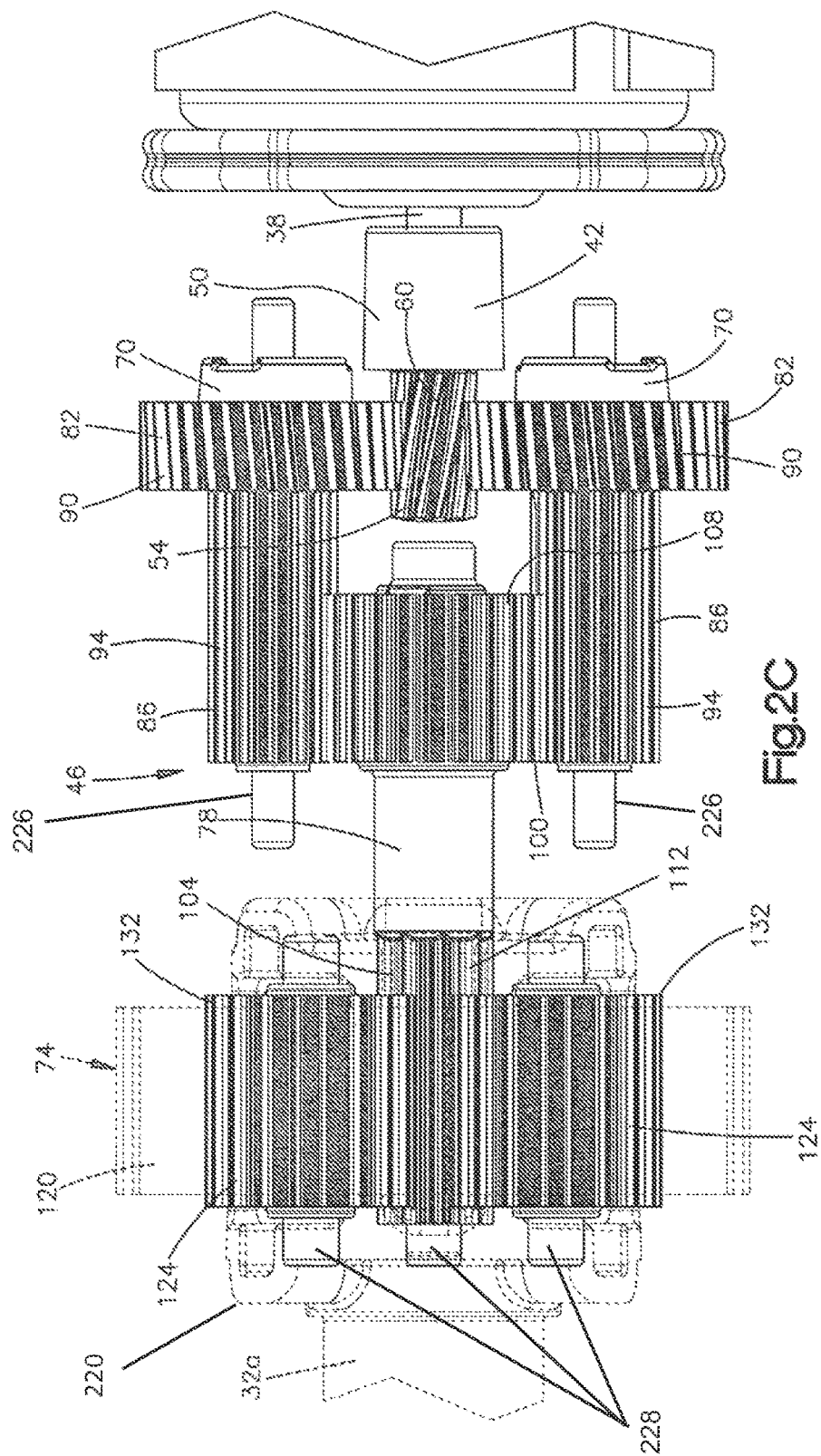

QUIET MOTORIZED WINDOW TREATMENT SYSTEM

CROSS-REFERENCE TO RELATED APPLICATIONS

This application claims priority to U.S. provisional patent application No. 61/879,305, filed Sep. 18, 2013. U.S. provisional patent application No. 61/879,305 is incorporated herein by reference in its entirety.

BACKGROUND

A motorized window treatment system may include a covering material wound onto a roller tube. The covering material may include a weighted hembar at a lower end of the covering material, such that the covering material extends vertically (e.g., hangs) in front of a window. Motorized window treatments may include a drive system that is coupled to the roller tube to provide for tube rotation, such that the lower end of the covering material can be raised and lowered (i.e., moved in a vertical direction) by rotating the roller tube. The drive system may include a motor having a drive shaft and a gear train that is operatively coupled to (e.g., in communication with) the drive shaft and roller tube such that actuation of the motor causes the roller tube to rotate. The motor may be a direct current (DC) motor powered by a DC power source or an alternating current (AC) motor powered by an AC power source.

The torque capability and efficiency of a DC motor may vary depending on the motor speed. While the particular values of motor speed, torque capability, and efficiency may vary for different DC motors, certain characteristics may be shared by most DC motors. For example, motor speed and motor torque capability may vary linearly, and inversely, throughout the entire range of motor speeds including very low speeds approaching zero. Motor efficiency may generally reach peak efficiency under light-duty conditions (e.g., relatively low torque capability at a motor speed greater than 50% of maximum motor speed). When a DC motor operates at a peak efficiency (e.g., at greater speeds), the motor may generate undesired noise. Manufactures may operate the motor at a slower speed and a lower efficiency, to reduce a noise level of the motor.

SUMMARY

A motorized window treatment system may include a roller tube, a covering material, and a drive assembly. The covering material may be windingly attached to the roller tube such that rotating the roller tube causes the covering material to move between a first position and a second position. The first position and the second position may include one or more positions between and including an open position and a closed position.

The drive assembly may be operatively coupled to the roller tube for rotating the roller tube about a longitudinal axis. The drive assembly may include a motor, a drive gear, and/or a gear assembly. The motor may include a drive shaft that is elongate parallel to a longitudinal axis of the roller tube. The drive shaft may define a drive shaft rotational axis. The drive shaft may include an end that is distal from the motor. The drive shaft may define a drive shaft diameter.

The drive gear may be attached to the drive shaft. The drive gear may define a rotational axis. The drive gear rotational axis may be in a coaxial relationship with the drive shaft rotational axis. The drive gear may include a toothed portion distal from the end of the drive shaft. The toothed portion of the drive gear may be adapted to rotate about the drive gear rotational axis. The toothed portion of the drive gear may define a root diameter. The root diameter may be less than the drive shaft diameter. The toothed portion may be spaced from the drive shaft along the drive shaft rotational axis. The toothed portion may include eight or more and twelve or less gear teeth. The gear teeth may be helical gear teeth. The toothed portion may be plastic. The drive gear may include a coupling portion. The coupling portion may extend from the toothed portion. The coupling portion may mate with the drive shaft to operatively couple the drive gear to the drive shaft. The coupling portion may include a non-plastic portion. The non-plastic portion may operatively couple the toothed portion to the coupling portion.

The gear assembly may be operatively coupled to the toothed portion of the drive gear and operatively coupled to the roller tube such that actuation of the motor causes the roller tube to rotate about the longitudinal axis. The gear assembly may include a pair of intermediate gears. The pair of intermediate gears may be disposed on opposed sides of the toothed portion of the drive gear. The gear assembly may include a planetary gear set. The planetary gear set may be operatively coupled to the roller tube. The gear assembly may include a connecting gear. The connecting gear may be operatively coupled to the pair of intermediate gears and the planetary gear set.

BRIEF DESCRIPTION OF THE DRAWINGS

FIG. 1B is an exploded view of the example roller tube shown in FIG. 1A, the motorized window treatment system including a drive assembly at least partially disposed within the roller tube and configured to rotate the roller tube so as to cause the covering material to move between a closed position and an open position.

FIG. 2A is a top perspective view of the example drive assembly shown in FIG. 1B, the drive assembly including a motor, a drive gear coupled to the motor, and a gear assembly operatively coupled to the drive gear and the roller tube such that actuation of the motor causes the roller tube to move the covering material between the open position and the closed position.

FIG. 2B is a top plan view of the example drive assembly shown in FIG. 2A.

FIG. 2C is a detailed view of the example drive gear and gear assembly of the drive assembly shown in FIG. 2B, the gear assembly including gear a pair of intermediate gears disposed on opposed sides of the drive gear, a planetary gear set that is operatively coupled to the roller tube, and a connecting gear that is operatively coupled to the pair of intermediate gears and the planetary gear set.

DETAILED DESCRIPTION

Figure 1A:
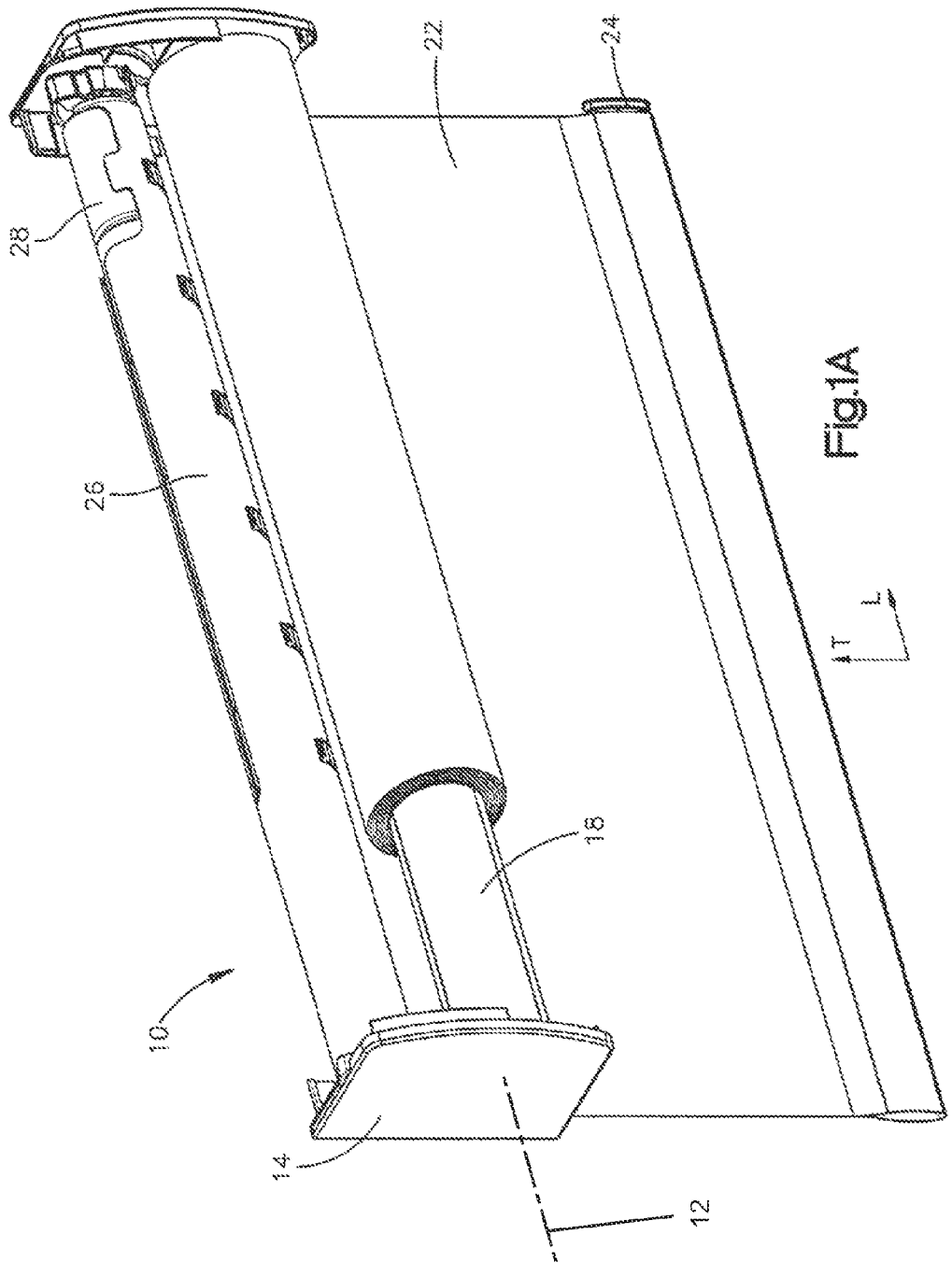
FIG. 1A is a perspective view of an example motorized window treatment system that includes a roller tube and a covering material windingly attached to the roller tube.

FIGS. 1A and 1B depict an example motorized window treatment system 10 that includes a roller tube 18 and a covering material 22 windingly attached to the roller tube 18. The motorized window treatment system 10 includes a housing 14 (e.g., a pocket or a headrail) that is configured to be coupled to or otherwise mounted to a structure. For example, the housing 14 may be configured to be mounted to (e.g., attached to) a window frame, a wall, or other structure, such that the motorized window treatment system 10 is mounted proximate to an opening (e.g., over the opening or in the opening), such as a window for example. The motorized window treatment system 10 may further include a rotational element, such as a roller tube 18 that is elongate along a longitudinal direction L, and that is rotatably mounted (e.g., rotatably supported) within the housing 14. The longitudinal direction L may be referred to as a first direction. The roller tube 18 may define a longitudinal axis 12. The motorized window treatment system 10 may include a covering material 22 that is windingly attached to the roller tube 18, such that rotation of the roller tube 18 causes the covering material 22 to wind or unwind from the roller tube 18 along a transverse direction T that extends perpendicular to the longitudinal direction L. The transverse direction T may be referred to as a second direction. For example, rotation of the roller tube 18 may cause the covering material 22 to move between a raised (e.g., open) position and a lowered (e.g., closed) position along the transverse direction T.

The covering material 22 may include a first end (e.g., a top or upper end) that is coupled to the roller tube 18 and a second end (e.g., a bottom or lower end) that is coupled to a hembar 24. The hembar 24 may be configured, for instance weighted, to cause the covering material 22 to hang vertically. Rotation of the roller tube 18 may cause the hembar 24 to move toward or away from the housing 14. The housing 14 may be made of any suitable material, such as plastic or metal. It should be appreciated, however, that the housing 14 may be made from any material, or from any combination of materials. The covering material 22 may be any suitable material, or form any combination of materials. For example, the covering material 22 may be "scrim," woven cloth, non-woven material, light-control film, screen, and/or mesh. The covering material 22 may be any type of shade. For example, the covering material 22 may be a roller shade as illustrated, a soft sheer shade, a drapery, or a cellular shade.

As shown in FIG. 1A, the motorized window treatment system 10 may include a battery compartment 26. The battery compartment 26 may be configured to retain a plurality of batteries 28. The battery compartment 26 may be spaced from the roller tube 18 as illustrated. The battery compartment 26 may be disposed within the roller tube 18. The batteries 28 may be configured to power a drive assembly, a microprocessor, and/or any other electrical component of the motorized window treatment system 10. The motorized window treatment system 10 may be hard wired.

As shown in FIG. 1B, the motorized window treatment system 10 may include a drive assembly 30, a control circuit 31 electrically connected to the drive assembly 30, a first idler 32a, and a second idler 32b. The drive assembly 30, the control circuit 31, the first idler 32a, and the second idler 32b may at least partially be disposed within the roller tube 18. For example, the control circuit 31 may include a microprocessor and may be mounted to a printed circuit board (PCB). The drive assembly 30 and the control circuit 31 may be powered by the batteries 28. The drive assembly 30 may be coupled to the first idler 32a such that when the drive assembly 30 is actuated, the first idler 32a is driven by the drive assembly 30 to thereby cause the roller tube 18 to rotate. The second idler 32b may be passive and may rotate as the first idler 32a is driven by the drive assembly 30. The drive assembly 30 and control circuit 31 may be configured to allow for control of the rotation of the roller tube 18. A user of the motorized window treatment system 10 may control the rotation of the roller tube 18 to move the covering material 22 to a desired position. The drive assembly 30 may include a sensor that monitors the position of the covering material 22, so that the control circuit 31 knows the position of the covering material 22 relative to one or more limits (e.g., an upper limit and/or a lower limit) of the covering material 22 at any given time. The drive assembly 30 may be locally controlled (e.g., with a push button) and/or remotely controlled (e.g. wirelessly controlled with an infrared (IR) or radio frequency (RF) remote control device). The control circuit 31 may include an RF transceiver or receiver, and/or an antenna that may be enclosed within the housing 14 or coupled to an exterior portion of the housing 14. Examples of drive assemblies and control circuits for motorized roller shades are described in greater detail in U.S. Pat. No. 6,983,783, issued Jan. 10, 2006, entitled "Motorized Shade Control System." U.S. Pat. No. 7,723,939, issued May 25, 2010, entitled "Radio-Frequency Controlled Motorized Roller Shade," and U.S. Pat. No. 7,839,109, issued Nov. 23, 2010, entitled "Method Of Controlling A Motorized Window Treatment," the entire contents of each of which are hereby incorporated herein by reference. It should be appreciated, that the drive assembly 30 may be configured to rotate rotational elements other than a roller tube 18. For example, the drive assembly 30 can be configured to rotate a drive shaft that winds up lift cords as disclosed in U.S. Publication No. 2012/0261078, entitled "Motorized Window Treatment," the entire contents of which is hereby incorporated herein by reference.

As shown in FIG. 1B, the drive assembly 30 and the control circuit 31 may be disposed within a drive housing 200. The drive housing 200 may include a first section 202 and a second section 204. The first section 202 and the second section 204 may fit together along a split line 232 to house the drive assembly 30 and the control circuit 31. The drive assembly 30 may be supported in the drive housing 200 by one or more of the following non-rotating support parts. The drive assembly 30 may include a collar 218 that is disposed between the motor 34 and a gear assembly. The collar 218 may rest in a molded channel of the drive housing 200. The drive assembly 30 may include one or more disks 212, 216 that support the rotating elements of the drive assembly 30 within the drive housing 200. The disk 216 may include a plurality of tabs 214 that engage a plurality of slots in the drive housing 200. The disk 212 may be disposed within one or more channels in the drive housing 200. The drive assembly 30 may include a ring gear 120 with a plurality of tabs 210 that engage a plurality of slots 208 in the drive housing 200.

As shown in FIG. 1B, the first idler 32a may be connected to a cage 220 that engages one or more planetary gears. The cage 220 may be spaced from the first idler 32a such that the drive housing 200 may be supported by a shaft 224 connecting the first idler 32a to the cage 220. The cage 220 may include a plurality of slots 222. Each of the plurality of slots 222 may accept a respective planetary gear shaft such that rotation of the one or more planetary gears rotates the cage 220 and the first idler 32a. The shafts of the planetary gears may be rotatably captured within the slots 222, such that the shafts of the planetary gears cause the cage 220, the first idler 32a, and the roller tube 18 to rotate about the longitudinal axis 12 as the shafts of the planetary gears rotate about the longitudinal axis 12.

Figure 2D:
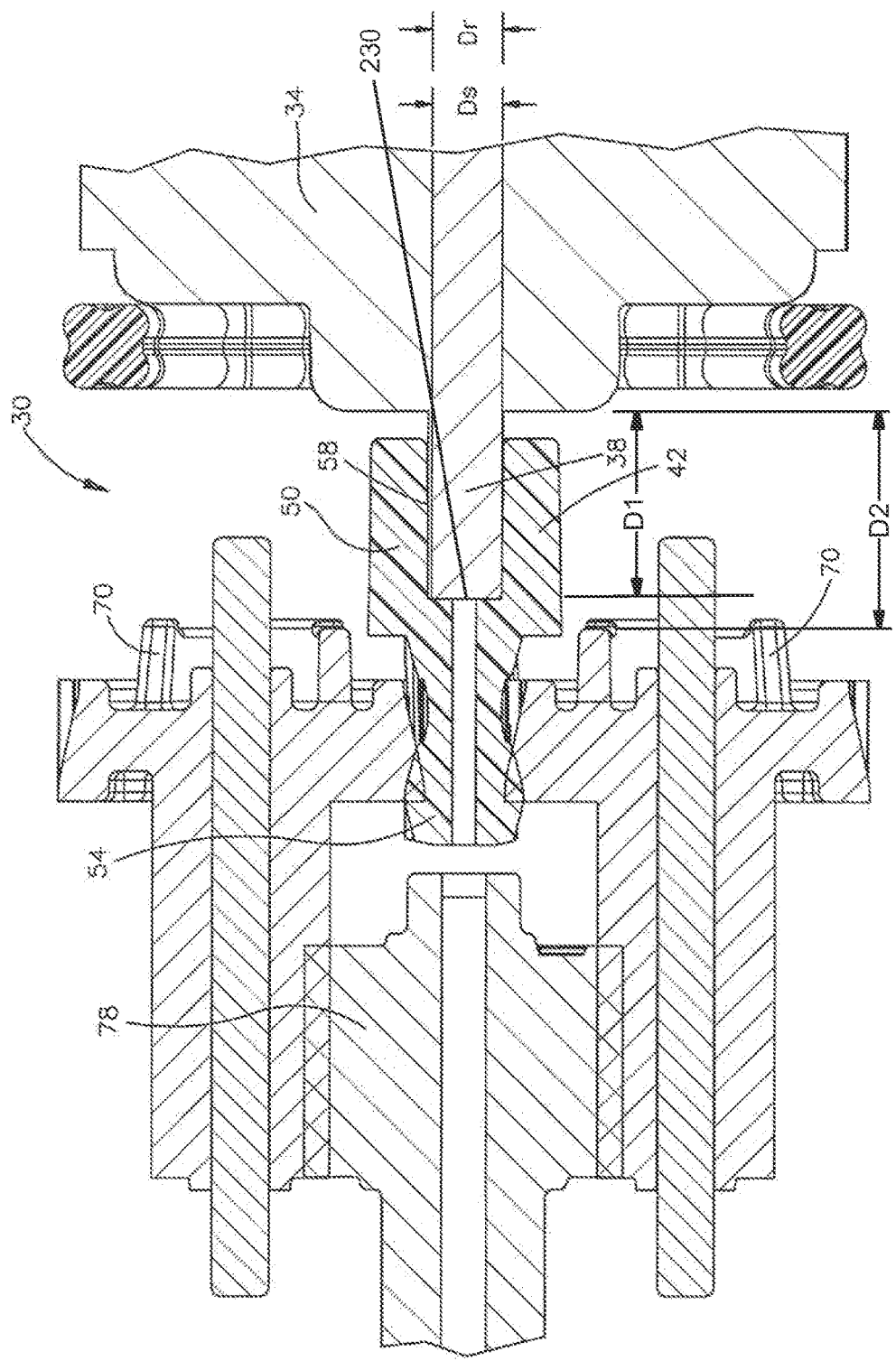
FIG. 2D is a cross-section of the example drive gear and the gear assembly shown in FIG. 2C, the drive gear including a toothed portion that is cantilevered with respect to a drive shaft of the motor and is spaced from the drive shaft of the motor along a longitudinal direction.

FIGS. 2A-2D depict an example drive assembly 30. As shown in FIGS. 2A and 2B, a drive assembly 30 may include a motor 34 having a drive shaft 38 that is elongate along the longitudinal direction L. In accordance with the illustrated orientation of the motorized window treatment system 10, the longitudinal direction L extends parallel to a longitudinal axis 12 of the roller tube 18. The drive shaft 38 may define a drive shaft rotational axis 206. The drive shaft 38 may include a distal end 230 that is spaced from the motor 34. The distal end 230 may be a first distance D1 from the motor 34. An intermediate gear 70 may be a second distance D2 from the motor 34. The second distance D2 may be longer than the first distance D1. The drive assembly 30 may include a drive gear 42 that is attached (e.g., fixedly attached) to the drive shaft 38 and may include a gear assembly 46. The gear assembly 46 may be operatively coupled to (e.g., in communication with) the drive gear 42 and the roller tube 18 such that actuation of the motor 34 transmits rotation of the drive shaft 38 through the gear assembly 46 and to the roller tube 18. For example, the gear assembly 46 may be operatively coupled to the drive gear 42 and the roller tube 18, such that actuation of the motor 34 causes the roller tube 18 to move the covering material 22 between a first position (e.g., an open position) and a second position (e.g., a closed position). The drive assembly 30 may be configured such that the motor 34 can operate at an efficient speed while remaining below a noise threshold (e.g., maintaining satisfactory decibel levels). For example, the drive assembly 30 may be configured so that the motor 34 can be operated at a more efficient speed as compared to the known drive assemblies while a noise level of the motorized window treatment system remains below 33 dBa.

The drive gear 42 may include a coupling portion 50 and a toothed portion 54 that extends from the coupling portion 50 along the longitudinal direction L. As shown in FIG. 2D, the coupling portion 50 may define a channel 58 that is elongate along the longitudinal direction L and is configured to receive the drive shaft 38 to thereby operatively couple (e.g., couple) the drive gear 42 to the drive shaft 38. The coupling portion 50 and the toothed portion 54 may be made of a non-metal material (e.g., a plastic material). The drive gear 42 may be made of any material.

As shown in FIG. 2D, the drive gear 42 may be attached to the drive shaft 38, such that the toothed portion 54 is spaced from the distal end 230 of the drive shaft 38. The toothed portion 54 may be spaced from the motor 34 (e.g., by approximately the second distance D2 along the longitudinal direction L). The toothed portion 54 may be cantilevered with respect to the drive shaft 38 along the longitudinal direction L. For example, the teeth of the toothed portion 54 may be supported outwardly from the drive shaft 38. As shown in FIG. 2D, the toothed portion 54 may be cantilevered with respect to the drive shaft 38, such that the toothed portion 54 is spaced from the drive shaft 38 along the longitudinal direction L and does not overlap the drive shaft 38. The drive shaft 38 may define a drive shaft diameter $D_S$. The toothed portion 54 may define a root diameter $D_R$. The root diameter $D_R$ may be less than or equal to the drive shaft diameter $D_S$. The drive gear 42 may define a rotational axis in a coaxial relationship with the drive shaft rotational axis 206. When compared to a non-cantilevered drive gear, the smaller or cantilevered drive gear 42 may move slower and may reduce transmitted vibrations and noise levels. A portion of the toothed portion 54 may overlap the drive shaft 38 such that a majority of the toothed portion 54 is cantilevered with respect to the drive shaft 38.

The toothed portion 54 of the drive gear 42 may include between eight and twelve (e.g., eight or more and twelve or less) gear teeth 60. As shown in FIGS. 2C and 2D, each gear tooth 60 may define a helical gear tooth. The toothed portion 54 may have any number of gear teeth 60. The gear teeth 60 may have any gear configurations (e.g., a gear configuration other than helical). For example, the toothed portion 54 may have thirteen or more teeth and may define standard straight gear teeth.

As shown in FIGS. 2A-2C, the gear assembly 46 may be operatively coupled to (e.g., in meshed communication with) the toothed portion 54 of the drive gear 42 and the roller tube 18 via the first idler 32a, such that actuation of the motor 34 transmits rotation of the drive shaft 38 to the roller tube 18. As shown in FIG. 2C, the gear assembly 46 may include a pair of intermediate gears 70 disposed on opposed sides of the toothed portion 54 of the drive gear 42, a planetary gear set 74 that is coupled to the roller tube 18 (e.g., via the first idler 32a), and a connecting gear 78 that is operatively coupled (e.g., in meshed communication with) both the (e.g., the pair of) intermediate gears 70 and the planetary gear set 74.

The intermediate gears 70 may each include a first gear portion 82 and a second gear portion 86 that extends from the first gear portion 82 along the longitudinal direction L. The first gear portions 82 may include a plurality of helical gear teeth 90 and the second gear portions 86 may include a plurality of standard straight gear teeth 94. The gear teeth 90 and the gear teeth 94 may have any gear configurations. As shown in FIG. 2C, the gear teeth 90 of the first gear portions 82 may mesh with the helical gear teeth 60 of the drive gear 42, such that when the drive gear 42 is driven by the motor 34, rotation of the drive gear is transmitted to the intermediate gears 70.

The intermediate gears 70 may be disposed adjacent the drive gear 42. For example, as shown the intermediate gears 70 are disposed on opposed sides of the drive gear 42, such that the first gear portions 82 of the intermediate gears 70 are operatively coupled to the toothed portion 54 of the drive gear 42, and such that respective axles 226 of the intermediate gears 70 are aligned with respect to each other along the transverse direction T. Any forces acting on the toothed portion 54 by one of the pair of intermediate gears 70 may be offset by corresponding forces acting on the toothed portion 54 by the other of the pair of intermediate gears 70. Each intermediate gear 70 may apply an equal and opposite force to the toothed portion 54 of the drive gear 42 so as to reduce the load on the cantilevered toothed portion 54 and reduce or otherwise prevent flexing of the toothed portion 54. A drive gear may be prone to flexing under the load of one intermediate gear. Flexing of the drive gear may cause a whining noise. The corresponding (e.g., equal and opposite) forces from a pair of intermediate gears may reduce the noise of the drive gear and gear assembly.

As shown in FIGS. 2B and 2C, the connecting gear 78 may include a first gear portion 100 and a second gear portion 104 that is spaced from the first gear portion 100 along the longitudinal direction L. The first gear portion 100 may include a plurality of standard straight gear teeth 108 and the second gear portion 104 may include a plurality of standard straight gear teeth 112. The gear teeth 108 and 112 may have any gear configurations. As shown in FIG. 2C, the gear teeth 108 of the first gear portion 100 may mesh with the gear teeth 94 of the pair of intermediate gears 70 such that when the pair of intermediate gears 70 are driven by the drive gear 42, rotation of the pair of intermediate gears 70 is transmitted to the connecting gear 78.

The planetary gear set 74 may include a ring gear 120 and a plurality of planetary gears 124 that are operatively coupled (e.g., in meshed communication with) the ring gear 120 and the second gear portion 104 of the connecting gear 78. The planetary gears 124 may be rotatably coupled to the first idler 32a and may be disposed within the ring gear 120 such that the planetary gears 124 and first idler 32a together rotate around the ring gear 120. For example, as shown, each planetary gear 124 includes a shaft 228. The shaft 228 of each planetary gear 124 may be disposed in a corresponding slot 222 of the cage 220. The shafts 228 of the planetary gears 124 may freely rotate in the slots 222, such that the shafts 228 are rotatably captive in the slots 222.

The ring gear 120 may include a plurality of internal gear teeth 128 (see FIG. 1B) and each planetary gear 124 may include a plurality of gear teeth 132 that mesh with the gear teeth 128 of the ring gear 120 and with the gear teeth 112 of the second gear portion 104 of the connecting gear 78 such that when the connecting gear 78 is driven by the pair of intermediate gears 70, rotation of the connecting gear 78 is transmitted to the planetary gears 124. The planetary gears 124 and the first idler 32a may rotate around the ring gear 120 in response to rotation of the connecting gear 78. The second gear portion 104 may act as a sun gear to the planetary gears 124. The illustrated planetary gear set 74 includes three planetary gears 124 that are rotatably coupled to the first idler 32a. It should be appreciated that the planetary gear set 124 is not limited to three planetary gears 124, and that the planetary gear set 74 may be alternatively configured to include any number of planetary gears 124.

The pair of intermediate gears 70, planetary gear set 74, and connecting gear 78 may be made from any material. For example, the pair of intermediate gears 70, planetary gear set 74, and connecting gear 78 may be made from a plastic material. The pair of intermediate gears 70, connecting gear 78, ring gear 120, and planetary gears 124 may include any number of gear teeth, so long as the gears of the gear assembly mesh together.

In use, actuation of the motor 34 may cause the drive gear 42 to rotate. Rotation of the drive gear 42 may be transferred through the gear assembly 46 and to the roller tube 18. The cantilevered toothed portion 54 of the drive gear 42 may reduce the noise (e.g., decibel levels) of the drive assembly 30. Reducing the noise of the drive assembly 30 may allow the motor 34 to be operated at a higher and/or more efficient speed. Disposing the intermediate gears 70 on opposed sides of the toothed portion 54 of the drive gear 42 may allow the intermediate gears 70 to offset forces applied by the intermediate gears 70 to the cantilevered toothed portion 54 of the drive gear 42. For example, a first one of the intermediate gears 70 may offset any forces transferred to the cantilevered toothed portion 54 by the other one of the intermediate gears 70. Offsetting any forces transferred may reduce fatigue of the cantilevered toothed portion 54 and may allow the drive assembly 30 to be operated with a reduced (e.g., without) risk of failure. When the drive assembly 30 is quieter and/or operated at more efficient speeds, less energy may be required to operate the motorized window treatment system 10. When the drive assembly 30 is powered by batteries, more efficient operation may prolong battery life.

Figure 3:
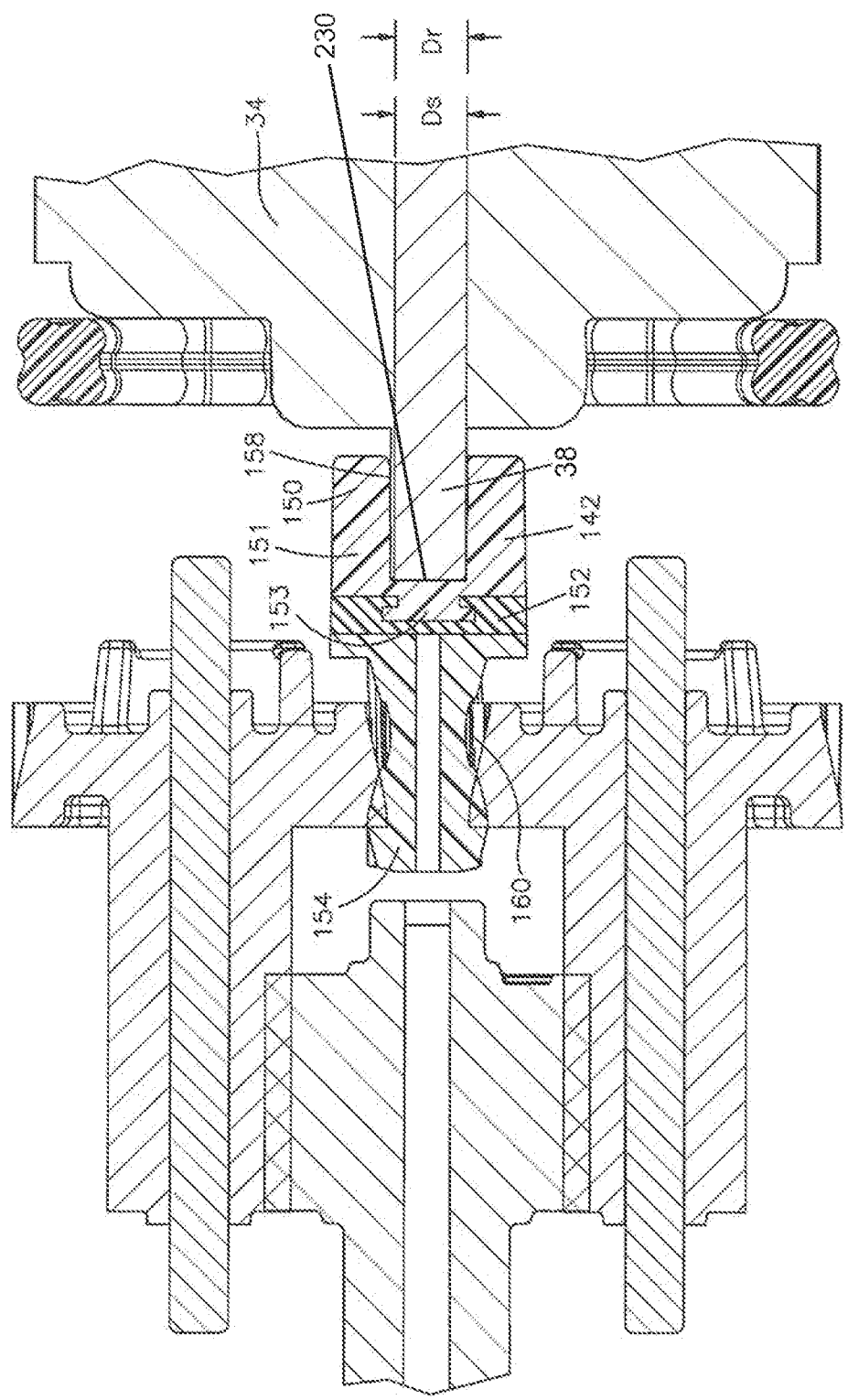
FIG. 3 is a cross-section of an example drive gear that includes a plastic toothed portion and a coupling portion having a non-plastic portion and a plastic portion.

FIG. 3 depicts an example drive gear 142 that may be implemented in the motorized window treatment 10 (e.g., in place of the drive gear 42). As shown, the drive gear 142 may include a plastic toothed portion 154 and a coupling portion 150 having a non-plastic portion 152 and a plastic portion 151. The drive gear 142 may include a coupling portion 150 and a toothed portion 154 that extends from the coupling portion 150 along the longitudinal direction L. As shown in FIG. 3, the coupling portion 150 may define a channel 158 that is elongate along the longitudinal direction L and may be configured to receive the drive shaft 38 to thereby couple the drive gear 142 to the drive shaft 38. The toothed portion 154 may be made of a plastic material. The coupling portion 150 may include a plastic portion 151 and a non-plastic portion 152. The plastic portion 151 may define the channel 158 and may couple the drive gear 142 to the drive shaft 38. The non-plastic portion 152 may be made of rubber and may couple the toothed portion 154 to the plastic portion 151. The plastic portion 151 may include a coupling member 153. The non-plastic portion 152 may be overmolded onto the coupling member 153 to thereby couple the plastic portion 151 to the non-plastic portion 152. As shown in FIG. 3, the non-plastic portion 152 may isolate the toothed portion 154 from the drive shaft 38 to reduce the noise (e.g., the decibel levels) of the drive assembly. The toothed portion 154 may be attached to the non-plastic portion 152 using any known methods. The non-plastic portion 152 may be made of materials other than rubber.

The drive gear 142 may be coupled to the drive shaft 38 such that the toothed portion 154 is cantilevered with respect to the drive shaft 38 along the longitudinal direction L. As shown in FIG. 3, the entire toothed portion 154 may be cantilevered with respect to the drive shaft 38 such that the entire toothed portion 154 is spaced from the drive shaft 38 along the longitudinal direction L by at least the non-plastic portion 152 of the coupling portion 150. The drive shaft 38 may define a drive shaft diameter $D_S$. The toothed portion 154 may define a root diameter $D_R$. The root diameter $D_R$ may be less than or equal to the drive shaft diameter $D_S$.

The toothed portion 154 of the drive gear 142 may include between eight and twelve (e.g., eight or more and twelve or less) gear teeth 160. As shown in FIG. 3, each gear tooth 160 may define a helical gear tooth. The toothed portion 154 may have any number of gear teeth 160, and the gear teeth 160 may have any gear configurations. For example, the toothed portion 154 may have thirteen or more teeth and may be standard straight gear teeth.

The invention claimed is:

1. A motorized window treatment system comprising:
an elongate roller tube defining a longitudinal axis;
a covering material windingly attached to the roller tube; and
a drive assembly that is operatively coupled to the roller tube for rotating the roller tube about the longitudinal axis, the drive assembly including:
  a motor having a drive shaft that extends parallel to the longitudinal axis and defines a drive shaft rotational axis, the drive shaft defining a distal end that is spaced from the motor, wherein the drive shaft defines a drive shaft diameter;
  a drive gear that is attached to the distal end of the drive shaft, the drive gear having a toothed portion adapted to rotate about the drive shaft rotational axis, wherein the toothed portion of the drive gear is spaced from the distal end of the drive shaft along the drive shaft rotational axis and defines a root diameter that is less than the drive shaft diameter, and wherein the drive gear defines a channel that receives the distal end of the drive shaft; and
  a gear assembly operatively coupled to the toothed portion of the drive gear and operatively coupled to the roller tube such that actuation of the motor causes the drive gear to rotate the roller tube about the longitudinal axis.

2. The motorized window treatment system of claim 1, wherein the distal end of the drive shaft is spaced from the motor by a first distance and the toothed portion is spaced from the motor by a second distance that is longer than the first distance.

3. The motorized window treatment system of claim 1, wherein the toothed portion is comprised of plastic and the drive gear further includes a coupling portion that extends from the toothed portion and mates with the drive shaft so as to operatively couple the drive gear to the drive shaft, the coupling portion including a non-plastic portion that operatively couples the toothed portion to the coupling portion.

4. The motorized window treatment system of claim 1, wherein the toothed portion comprises less than 12 gear teeth.

5. The motorized window treatment system of claim 4, wherein the gear teeth are helical.

6. The motorized window treatment system of claim 1, wherein the gear assembly comprises a pair of intermediate gears disposed on opposed sides of the toothed portion of the drive gear, a planetary gear set that is operatively coupled to the roller tube, and a connecting gear that is operatively coupled to the pair of intermediate gears and the planetary gear set.

7. The motorized window treatment system of claim 6, wherein the gear assembly further comprises a cage that rotatably captures one or more shafts of the planetary gear set such that rotation of the planetary gear set causes the cage to rotate.

8. The motorized window treatment system of claim 7, wherein the cage is connected to the roller tube via an idler such that rotation of the cage causes the roller tube to rotate about the longitudinal axis.

9. A motorized window treatment system comprising:
a roller tube;
a covering material windingly attached to the roller tube;
a motor having a drive shaft, wherein the drive shaft defines a drive shaft diameter and a distal end that is spaced from the motor;
a drive gear attached to the drive shaft, the drive gear having a toothed portion that is spaced from the distal end of the drive shaft along a rotational axis of the drive shaft;
a pair of intermediate gears disposed on opposed sides of the toothed portion of the drive gear;
a planetary gear set;
a connecting gear operatively coupled to the pair of intermediate gears and the planetary gear set;
a cage that rotatably captures one or more shafts of the planetary gear set; and
an idler that operably connects the cage to the roller tube,
wherein rotation of the motor causes the drive gear to rotate, rotation of the drive gear causes the pair of intermediate gears to rotate, rotation of the pair of intermediate gears causes the connecting gear to rotate, rotation of the connecting gear causes respective planetary gear shafts of the planetary gear set to rotate about the drive shaft, rotation of the planetary gear shafts causes the cage and the idler to rotate, and rotation of the idler causes the roller tube to rotate, such that the covering material moves between an open position and a closed position.

10. The motorized window treatment system of claim 9, wherein the drive gear defines a channel, and wherein the distal end of the drive shaft is received within the channel.

11. The motorized window treatment system of claim 9, wherein the drive shaft defines a drive shaft diameter and the toothed portion of the drive gear defines a root diameter that is less than the drive shaft diameter.

12. The motorized window treatment system of claim 11, wherein the toothed portion comprises helical gear teeth.

13. A motorized window treatment system comprising:
a roller tube;
a covering material windingly attached to the roller tube; and
a drive assembly operatively coupled to the roller tube, the drive assembly including:
a motor having a drive shaft that defines a drive shaft diameter;
a drive gear attached to the drive shaft, the drive gear having a toothed portion that defines a plurality of gear teeth, wherein the toothed portion is spaced from a distal end of the drive shaft along a rotational axis of the drive shaft, the toothed portion defining a root diameter that is less than the drive shaft diameter, wherein the drive gear defines a channel that receives a portion of the drive shaft; and
a gear assembly operatively coupled to the toothed portion of the drive gear and operatively coupled to the roller tube such that actuation of the motor causes the roller tube to move the covering material between an open position and a closed position.

14. The motorized window treatment system of claim 13, wherein the plurality of gear teeth are helical gear teeth.

15. The motorized window treatment system of claim 13, wherein the drive shaft defines a distal end that is spaced a first distance from the motor, and wherein the toothed portion of the drive gear is spaced a second distance from the motor, wherein the second distance is longer than the first distance.

16. The motorized window treatment system of claim 13, wherein the drive gear is cantilevered with respect to a distal end of the drive shaft.

17. The motorized window treatment system of claim 13, wherein the drive gear further includes a coupling portion that extends from the toothed portion and mates with the drive shaft so as to operatively couple the drive gear to the drive shaft, the coupling portion comprising a non-plastic portion that operatively couples the toothed portion to the coupling portion.

18. A drive assembly for rotating a roller tube about a longitudinal axis to open or close a window treatment, the drive assembly comprising:
a motor having a drive shaft that extends parallel to the longitudinal axis of the roller tube and defining a drive shaft rotational axis, the drive shaft defining a distal end that is spaced from the motor, wherein the drive shaft defines a drive shaft diameter;
a drive gear that is attached to the distal end of the drive shaft, the drive gear having a toothed portion adapted to rotate about the drive shaft rotational axis, wherein the toothed portion of the drive gear is spaced from the drive shaft along the drive shaft rotational axis and defines a root diameter that is less than the drive shaft diameter, and wherein the drive gear defines a channel that receives the distal end of the drive shaft; and
a gear assembly operatively coupled to the toothed portion of the drive gear and operatively coupled to the roller tube such that actuation of the motor causes the roller tube to rotate about the longitudinal axis.

19. The drive assembly of claim 18, wherein the drive shaft defines a drive shaft diameter and the toothed portion of the drive gear defines a root diameter that is smaller than the drive shaft diameter.

20. The drive assembly of claim 18, wherein the toothed portion comprises helical gear teeth.

21. The drive assembly of claim 18, wherein the toothed portion is comprised of plastic and the drive gear further includes a coupling portion that extends from the toothed portion and mates with the drive shaft so as to operatively couple the drive gear to the drive shaft, the coupling portion comprises a non-plastic portion that operatively couples the toothed portion to the coupling portion.

22. The drive assembly of claim 18, wherein the distal end of the drive shaft is spaced from the motor by a first distance and the toothed portion is spaced from the motor by a second distance that is longer than the first distance.

23. The drive assembly of claim 18, wherein the drive gear is cantilevered with respect to a distal end of the drive shaft.

24. The drive assembly of claim 18, wherein the gear assembly comprises a pair of intermediate gears disposed on opposed sides of the toothed portion of the drive gear, a planetary gear set that is operatively coupled to the roller tube, and a connecting gear that is operatively coupled to the pair of intermediate gears and the planetary gear set.

25. The drive assembly of claim 24, wherein the gear assembly further comprises a cage that rotatably captures one or more shafts of the planetary gear set such that rotation of the planetary gear set causes the cage to rotate.

26. The drive assembly of claim 25, wherein the cage is connected to the roller tube via an idler such that rotation of the cage causes the roller tube to rotate about the longitudinal axis.

\* \* \* \* \*